(12) United States Patent
Zhou et al.

(10) Patent No.: US 11,228,794 B2
(45) Date of Patent: Jan. 18, 2022

(54) METHOD, COMPUTER DEVICE, AND STORAGE MEDIUM FOR MEDIA CODE RATE SELF-ADAPTATION

(71) Applicant: Beijing Dajia Internet Information Technology Co., Ltd., Beijing (CN)

(72) Inventors: Chao Zhou, Beijing (CN); Shucheng Zhong, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/070,576

(22) Filed: Oct. 14, 2020

(65) Prior Publication Data
US 2021/0051350 A1 Feb. 18, 2021

Related U.S. Application Data

(63) Continuation of application No. PCT/CN2019/096362, filed on Jul. 17, 2019.

(30) Foreign Application Priority Data

Jul. 19, 2018 (CN) .......................... 201810796566.8

(51) Int. Cl.
*H04N 21/23* (2011.01)
*H04N 21/239* (2011.01)
(Continued)

(52) U.S. Cl.
CPC ......... *H04N 21/2393* (2013.01); *G06F 17/18* (2013.01); *H04L 65/601* (2013.01);
(Continued)

(58) Field of Classification Search
None
See application file for complete search history.

(56) References Cited

U.S. PATENT DOCUMENTS 6,470,378 B1 * 10/2002 Tracton ................... H04L 29/06
                                                                 709/203
7,143,432 B1 * 11/2006 Brooks .......... H04N 21/234363
                                                                 725/105
(Continued)

FOREIGN PATENT DOCUMENTS

CN      102088620 A      6/2011
CN      102263783 A      11/2011
(Continued)

OTHER PUBLICATIONS

International Search Report for International Application No. PCT/CN2019/096362 dated Sep. 26, 2019.
(Continued)

*Primary Examiner* — Cai Y Chen
(74) *Attorney, Agent, or Firm* — Meunier Carlin & Curfman LLC (57) ABSTRACT

Disclosed are a method and apparatus, a computer device and a storage medium for media code rate self-adaptation. The method includes the following steps: acquiring network quality information of a user network; acquiring, based on a pre-set code rate correspondence list, code rate information corresponding to the network quality information; and determining a code rate indicated by the code rate information as a code rate parameter of a target object.

18 Claims, 4 Drawing Sheets

(51) Int. Cl.
*G06F 17/18* (2006.01)
*H04L 29/06* (2006.01)
*H04N 21/233* (2011.01)
*H04N 21/234* (2011.01)
*H04N 21/235* (2011.01)

(52) U.S. Cl.
CPC ........... *H04L 65/80* (2013.01); *H04N 21/233* (2013.01); *H04N 21/234* (2013.01); *H04N 21/2353* (2013.01)

(56) References Cited

U.S. PATENT DOCUMENTS

| | | | | |
|---|---|---|---|---|
| 2007/0291835 | A1* | 12/2007 | Sung | H04N 19/164 375/240 |
| 2014/0348246 | A1* | 11/2014 | Fu | H04N 19/115 375/240.26 |
| 2015/0381690 | A1* | 12/2015 | Schmidt | H04L 65/607 709/231 |
| 2016/0269459 | A1 | 9/2016 | Harden et al. | |

FOREIGN PATENT DOCUMENTS

| | | |
|---|---|---|
| CN | 102695081 A | 9/2012 |
| CN | 105025351 A | 11/2015 |
| CN | 105407107 A | 3/2016 |
| CN | 106686409 A | 5/2017 |
| CN | 107809647 A | 3/2018 |
| CN | 109040801 A | 12/2018 |

OTHER PUBLICATIONS

First Office Action for Chinese Application No. 201810796566.8 dated Apr. 25, 2019.
Notice to Grant for Chinese Application No. 201810796566.8 dated Jun. 12, 2019.

* cited by examiner

METHOD, COMPUTER DEVICE, AND STORAGE MEDIUM FOR MEDIA CODE RATE SELF-ADAPTATION

The present application is the continuation application of International Application No. PCT/CN2019/096362, filed on Jul. 17, 2019, which is based upon and claims the priority from Chinese Patent Application No. 201810796566.8, filed with the China National Intellectual Property Administration on Jul. 19, 2018 and entitled "Method and Apparatus, Computer Device and Storage Medium for Media Code Rate Self-adaptation", which is hereby incorporated by reference in its entirety.

FIELD

The embodiments of the present application relate to the field of network technologies, in particular to a media code rate self-adaptation method and apparatus, a computer device and a storage medium.

BACKGROUND

With the development of science and technology as well as the accelerating pace of life, people are becoming more and more enthusiastic about leisure activities based on network. For example, short videos have become one of the most popular media for people. The short videos can facilitate users to record and share the experiences in life or work, e.g., services provided by Kwai and instagram, etc. By such short video services, the users shoot short videos (usually 10 seconds in length), then do some processing (for example, adding special effects, magic expressions and/or background music), and then upload them to the media server. On the server side, after authentication and validation confirmation, the short videos can be transcoded into multiple bit rates to adapt to the continuously changed network conditions, and pushed to terminal devices. Thus, other users can watch and share them.

The inventors found that the short video is independent and the bit rate decision for downloading the short video is determined from the beginning of downloading a new short video, so it is not like the live and on-demand scenarios in which there can be cached video data for compensating for bandwidth fluctuation. Therefore, when a user is watching a short video through a user terminal, he may encounter the stutter and other phenomena due to the network conditions over time and the bandwidth limitations, and the user experience is relatively poor.

SUMMARY

The embodiments of the present application provide a method and apparatus, a computer device and a storage medium for media code rate self-adaptation, by which the media code rate can be selected flexibly according to the user network.

In order to solve the above technical problem, a technical solution adopted by the embodiments created by the present application is to provide a method for media code rate self-adaptation. The method includes the steps of: acquiring network quality information of a user network; acquiring code rate information corresponding to the network quality information based on a preset code rate correspondence list; determining a code rate indicated by the code rate information as a code rate parameter of a target object.

In order to solve the above technical problem, an embodiment of the present application further provides an apparatus for media code rate self-adaptation. The apparatus includes: an acquisition module configured to acquire network quality information of a user network; a processing module configured to acquire code rate information corresponding to the network quality information based on a preset code rate correspondence list; a first execution module configured to determine a code rate indicated by the code rate information as a code rate parameter of a target object.

In order to solve the above technical problem, an embodiment of the present application further provides a computer device including a memory and a processor, where the memory stores computer readable instructions that cause the processor to perform the steps of the above method for media code rate self-adaptation when being executed by the processor.

In order to solve the above technical problem, an embodiment of the present application further provides a storage medium storing computer readable instructions, where the computer readable instructions cause one or more processors to perform the steps of the above method for media code rate self-adaptation when being executed by the one or more processors.

The beneficial effects of the embodiments of the present application include: by acquiring the network quality information of the user network, selecting the code rate information based on the network quality information, and determining the code rate indicated by the code rate information as the code rate parameter of the target object, the target object matching with the code rate parameter is thus selected and downloaded, avoiding the target object from stuttering or dropping frames during the download process, and improving the user experience.

BRIEF DESCRIPTION OF THE DRAWINGS

In order to illustrate the technical solutions in the embodiments of the present application more clearly, the accompanying figures which need to be used in describing the embodiments will be introduced below briefly. Obviously the accompanying figures described below are only some embodiments of the present application, and other accompanying figures can also be obtained by those skilled in the art according to these accompanying figures without creative labor.

DETAILED DESCRIPTION OF THE EMBODIMENTS

In order to enable those skilled in the art to better understand the technical solutions of the present application, the technical solutions in the embodiments of the present application will be described clearly and completely with reference to the accompanying drawings in the embodiments of the present application.

Some processes described in the specification and claims of the present application and the above drawings include multiple operations appearing in a particular order, but it should be clearly understood that these operations may not be performed in the order appearing herein or may be performed in parallel. The order numbers of operations such as 101 and 102 are only used to distinguish different operations, and the order number itself does not represent any execution sequence. In addition, these processes may include more or fewer operations, and these operations may be performed sequentially or in parallel. It should be noted that the terms such as "first", "second" and the like herein are used to distinguish different messages, devices, modules, etc., do not represent the sequence, and do not limit "first" and "second" as different types either.

The technical solutions in the embodiments of the present application will be described clearly and completely below in combination with the accompanying drawings in the embodiments of the present application. Obviously the described embodiments are only a part of the embodiments of the present application but not all the embodiments. Based upon the embodiments of the present application, all of other embodiments obtained by those skilled in the art without creative work pertain to the protection scope of the present application.

First Embodiment

Those skilled in the art can understand that the "terminal" or "terminal device" used herein include both the wireless signal receiver device (which is a wireless signal receiver device without the transmitting capability) and the receiving and transmitting hardware device (which is a receiving and transmitting hardware device capable of performing two-way communication on a two-way communication link). Such device may include: a cellular or other communication device, which is a cellular or other communication device with a single-line display or multi-line display or without a multi-line display; a Personal Communications Service (PCS), which may integrate voice, data processing, fax and/or data communication capabilities; a Personal Digital Assistant (PDA), which may include a radio frequency receiver, pager, Internet/Intranet access, web browser, notebook, calendar and/or Global Positioning System (GPS) receiver; a conventional laptop and/or palmtop computer or other device, which is a conventional laptop and/or palmtop computer or other device having and/or including a radio frequency receiver. The "terminal" or "terminal device" used here may be portable, transportable, installed in a transport (aviation, maritime and/or land), or suitable and/or configured to operate locally and/or operate anywhere else on earth and/or in space in a distributed form. The "terminal" or "terminal device" used here may also be a communication terminal, an Internet terminal, a music/video playback terminal, for example: PDA, Mobile Internet Device (MID) and/or mobile phone with music/video playback function, or may be a smart TV, a set-top box or other devices.

The VGG (Visual Geometry Group) is the deep convolutional neural network model developed by the researchers of the Oxford University Computer Vision Group and the GoogleDeepMind company. The VGG explored the relationship between the depth of convolutional neural network and its performance. By stacking 3*3 small convolution kernels and 2*2 maximum pooling layers repeatedly, the VGG successfully constructed a convolutional neural network with the depth of 16-19 layers. The VGG has the very strong extensibility, and its generalization to other image data is very good. The structure of the VGG is very simple, where the entire network uses the same convolution kernel size (3*3) and maximum pooling size (2*2). So far, the VGG is still often used to extract image features. The trained model parameters of the VGG are open sourced on its official website and can be used for retraining on the specific image classification tasks (equivalent to providing the very good initialization weights).

In this embodiment, the VGG convolutional neural network model is used for deep learning and content understanding. But it is not limited to this. In some optional embodiments, the convolutional neural network (CNN) model or a branch model of the CNN convolutional neural network model can be used.

Figure 1:
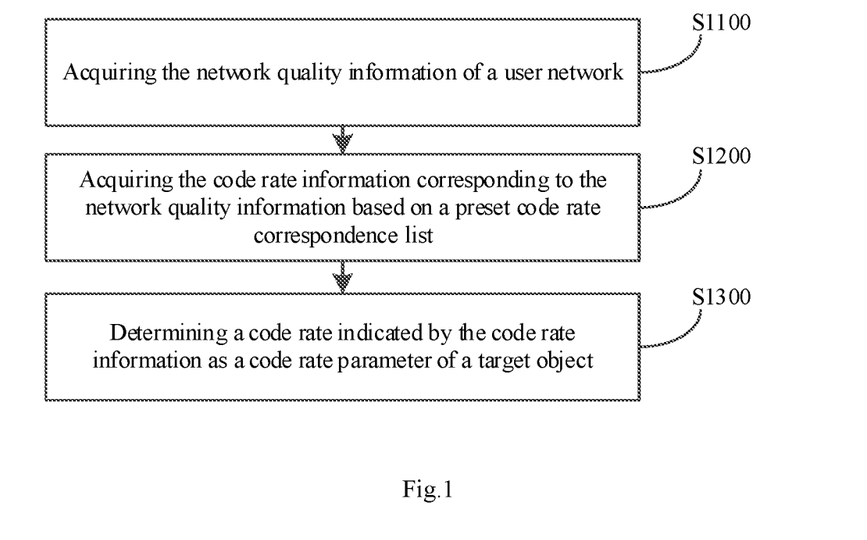
FIG. 1 is a schematic flow chart of a method for media code rate self-adaptation according to an embodiment of the present application.

Please referring to FIG. 1 for details, FIG. 1 is a flow chart of a method for media code rate self-adaptation according to an embodiment of the present application.

As shown in FIG. 1, the method includes the following steps.

S1100: acquiring the network quality information of a user network.

When a user uses a user terminal to connect to the network for browsing, the user terminal will exchange data with the network in real time. The network quality information refers to the data transmission rate when the user terminal exchanges data with the network. In some embodimes, the network quality information can be obtained by the quality test in the prior art, and the purpose of the quality test is to test the network connectivity quality of the user's Internet line.

The quality test is based on the standard ICMP protocol (RFC792), where the client sends the test data to the test platform and waits for a response, and the time delay and network packet loss between them are tested. The better the network connectivity quality, the smaller the delay value and the smaller the network packet loss rate.

In some embodiments, taking a user browsing a short video (usually a 10-second video) as an example. When the user is browsing a short video, the short video is not like the live and on-demand scenarios in which there can be cached video data for compensating for the fluctuation of the network bandwidth. Therefore, when the user browses the short video through a user terminal, the user terminal downloads the media data of the short video while decoding and rendering the media data for the user to watch. During the download process, the user terminal calculates the network quality information of the user network based on the size of the short video and the time for downloading the short video. Of course, it needs to be pointed out that the way to acquire the network quality information is not limited to the above-mentioned way. For different application scenarios, other ways may also be used to acquire the network quality information.

S1200: acquiring the code rate information corresponding to the network quality information based on a preset code rate correspondence list.

The code rate correspondence list is an association list of the code rate information and network quality information that is preset by the system. In some embodiments, different code rate information is graded and sorted from low to high in sequence, and different network qualities are also sorted from low to high and then associated with the sorted code rate information to form the code rate correspondence list, so that the code rate information corresponding to the network quality information can be acquired based on the code rate correspondence list, and the code rate information of the next media data to be downloaded is selected based on the quality of the user network.

S1300: determining a code rate indicated by the code rate information as a code rate parameter of a target object.

The code rate refers to the bit rate which is the number of bits transmitted per second. The unit is bps (short for Bit Per Second), where the higher the bit rate, the faster the data transmission speed. The bit rate includes the bit rate in sound and the bit rate in video. The bit rate in sound refers to the amount of binary data per unit time after an analog sound signal is converted into a digital sound signal, and is an index for indirectly measuring the audio quality. The principle of the bit rate (code rate) in video is the same as that in sound, and refers to the amount of binary data per unit time after an analog signal is converted into a digital signal. In some embodiments, taking the target object being a video as an example, the code rate of the target object is the video code rate which is the number of data bits transmitted per unit time during data transmission.

The target object is the next media data that the user network will download. In some embodiments, when a user is listening to a song, the song that the user listens to is not stored in the user terminal and needs to be downloaded. When a song is about to be played out, the media data of a next song needs to be downloaded. While a same song will be transcoded into a variety of different code rates on the server side and stored in the form of independent file. The code rate information is selected based on the network quality information of the user network and the preset code rate correspondence list, and the code rate indicated by the code rate information is determined as the code rate parameter of the next song, so as to download the media data of the song corresponding to the code rate parameter. In this embodiment, the code rate parameter of the target object is adjusted in real time based on the network quality of the user network, to avoid the stutter phenomenon during the download and playback process, thereby improving the user experience.

Figure 2:
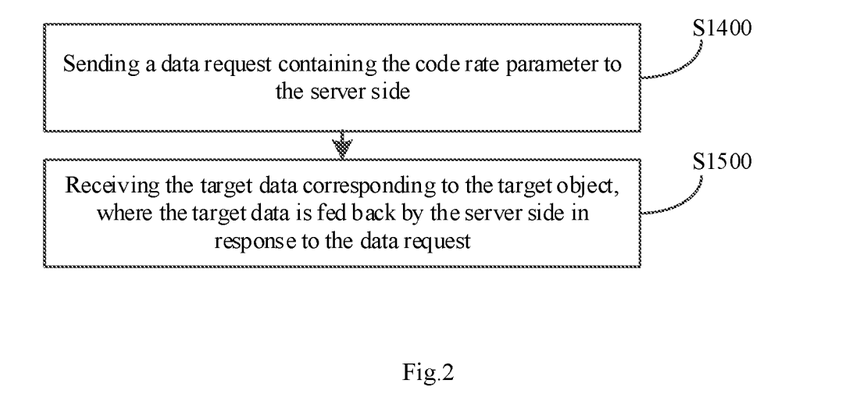
FIG. 2 is a schematic flow chart of acquiring the target data of the target object according to an embodiment of the present application.

In some embodiments, after obtaining the code rate parameter, the target data corresponding to the target object needs to be acquired from the server side. For a specific process of acquiring the target data, please refer to FIG. 2. FIG. 2 is a flow chart of acquiring the target data of the target object according to an embodiment of the present application.

As shown in FIG. 2, after the step S1300, the following steps are further included.

S1400: sending a data request containing the code rate parameter to the server side.

The data request is used for a terminal to make a data transmission request to the server side. Taking the data request being an HTTP request as an example, the HTTP request uses the HTTP protocol (short for the hypertext transfer protocol) and is used to ensure the communication between the client and the server. In some embodiments, the data request usually includes GET request and POST request. The GET request means requesting the data from the specified resource, and the POST request means submitting the data to be processed to the specified resource. The GET request is to directly request the data through URL, and the data information can be seen directly in the URL, such as https://www.baidu.com/con?from=self?_t=1466609839126, where the data after "?" is the requested data and is connected by "&". In some embodiments, the code rate parameter is contained in the URL, that is, the media data corresponding to the code rate parameter can be requested from the server. The URL refers to Uniform Resource Locator, which is a concise representation of the location and access method of resources available on the Internet and is the address of the standard resource on the Internet. Every file on the Internet has a unique URL, which contains the information that indicates the location of the file and how the browser should process it.

S1500: receiving the target data corresponding to the target object fed back by the server side in response to the data request.

The target data refers to the media data of the target object. For example, when the target object is video, the target data is video media data; and when the target object is audio, the target object is audio media data. In response to that the server side receives the data request containing the code rate parameter sent by the user terminal, the server side will select the target data of the target object based on the code rate parameter and send it to the user terminal.

In some embodiments, taking the target object being a short video as an example. On the server side, the video content is transcoded into a variety of different code rates and stored in the form of independent files. The code rate decision for the user terminal to download a short video is made at the beginning of downloading a new short video. Short videos are not like the live and on-demand scenarios in which there can be cached video data for compensating for fluctuation of the user network. Thus, when the user network fluctuates, the short video playback will be stuck. As such, the code rate information is acquired based on the network quality information of the user network and the preset code rate correspondence list, the code rate indicated by the code rate information is determined as the code rate parameter of a next short video, and then a data request containing the code rate parameter is sent to the server. The server receives the data request and selects the video data corresponding to the code rate parameter based on the data request, and then sends the video data to the user terminal. Since the code rate of the video data is determined based on the network quality of the user network, the code rate of the short video can be maximized on the premise that the user watches the short video without stutter, thereby providing the user with the smooth viewing experience with high video quality and no stutter.

Figure 3:
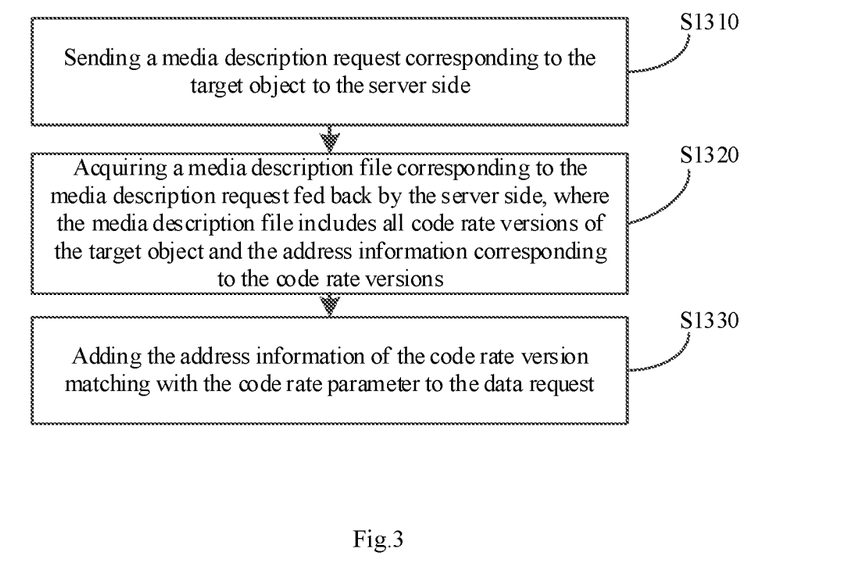
FIG. 3 is a schematic flow chart of acquiring the address information of the target object according to an embodiment of the present application.

In some embodiments, before sending the data request, the address information of the target object needs to be determined. For a specific process of acquiring the address information, please refer to FIG. 3. FIG. 3 is a flow chart of acquiring the address information of the target object according to an embodiment of the present application.

As shown in FIG. 3, before the step S1400, the following steps are further included.

S1310: sending a media description request corresponding to the target object to the server side.

Before requesting the media data of the target object, it is necessary to acquire the media description file of the target object, where the media description file is a file used to record various attributes of the media data of the target object. In some embodiments, after each video is uploaded to the server side, it is transcoded into different versions, and the related content (e.g., a series of information such as URL, duration, and instantaneous code rate) of these different versions is all recorded in the media description file.

S1320: acquiring a media description file corresponding to the media description request fed back by the server side, where the media description file includes all code rate versions of the target object and the address information corresponding to the code rate versions.

After each video is uploaded to the server side, it is transcoded into different versions, where these different versions are respectively configured with corresponding code rate versions. For example, a video can be transcoded into five different code rates, specifically including 1500 kbps, 1700 kbps, 2000 kbps, 2500 kbps and 2700 kbps, where the five different code rates correspond to five code rate versions, and each code rate version is configured with the corresponding address information. In some embodiments, the address information is the address information about where the transcoded video is stored on the server side, and the user terminal can request the data of the target object corresponding to the code rate from the server side based on the address information. It should be pointed out that the transcoding of the media file after being uploaded to the server side is not limited to the five code rates described above. For different application scenarios, the media file can be transcoded to other code rates after being uploaded to the server side.

S1330: adding the address information of the code rate version matching with the code rate parameter to the data request.

Since different code rate versions of the same target object are configured with different address information, the address information of the target object to be downloaded can be acquired if the code rate parameter matches with a code rate version. Taking a video being transcoded into three different code rates as an example, the transcoded video has the first code rate version (1500 kbps), the second code rate version (2000 kbps) and the third code rate version (2700 kbps). The first version of code rate corresponds to the first address information, the second version of code rate corresponds to the second address information, and the third version of code rate corresponds to the third address information. When the network quality of the user network is low, the user terminal requests the video data of the first version of code rate. When the network quality of the user network is in a stable and better state, the user terminal requests the video data of the third version of code rate, so that the code rate of the target object can be maximized under the premise of ensuring that the media data is played without stutter, thus acquiring the high-quality target object and improving the user experience.

Figure 4:
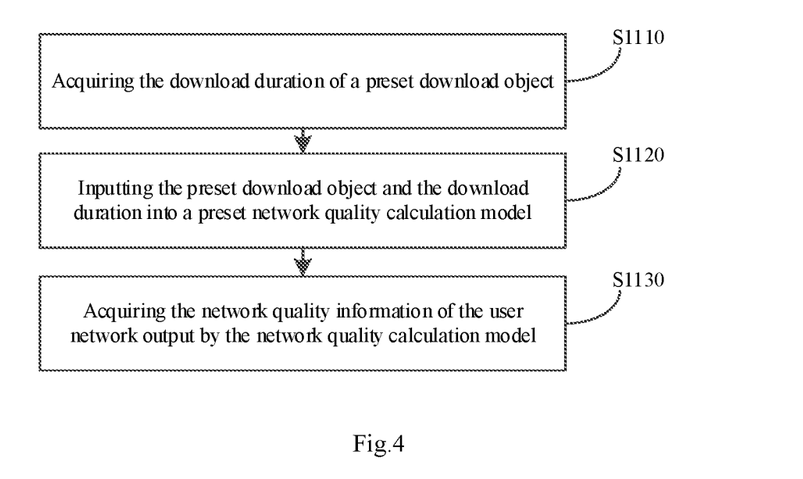
FIG. 4 is a schematic flow chart of acquiring the network quality information of the user network according to an embodiment of the present application.

In some embodiments, referring to FIG. 4, FIG. 4 is a flow chart of acquiring the network quality information of the user network according to an embodiment of the present application.

As shown in FIG. 4, in some embodiments, the step S1100 includes the following steps.

S1110: acquiring the download duration of a preset download object.

The preset download object is used to detect the quality of the user network. In some embodiments, the preset download object and the target object include at least one of audio and video. Taking browsing a short video as an example, the preset download object is the short video that is being downloaded and played by the user network, and the download duration of the short video is acquired. In another embodiment, taking a user using a user terminal to listen to a song as an example, the preset download object is the song that is being played by the user terminal, where the song is downloaded and played at the same time, and then the download duration in which the user network downloads the song can be acquired.

S1120: inputting the preset download object and the download duration into a preset network quality calculation model.

S1130: acquiring the network quality information of the user network output by the network quality calculation model.

The network quality information includes the uplink bandwidth information and downlink bandwidth information of the user network. The uplink bandwidth information includes the uplink rate while the downlink bandwidth information includes the downlink rate. The uplink rate refers to the data transmission rate when a user computer sends information to the network, and the downlink rate refers to the transmission rate when the network sends information to the user computer. The network quality calculation model is a calculation model preset by the system, and can obtain the network quality information of the user network by dividing the size of the preset download object by the download duration. It should be pointed out that the way to acquire the network quality information of the user network is not limited to the above-mentioned ways. Depending on the specific application scenarios, other ways may also be used to acquire the network quality information of the user network, for example: the download speed of the user network in a preset time period is acquired, and this download speed is taken as the network quality information of the user network.

Figure 5:
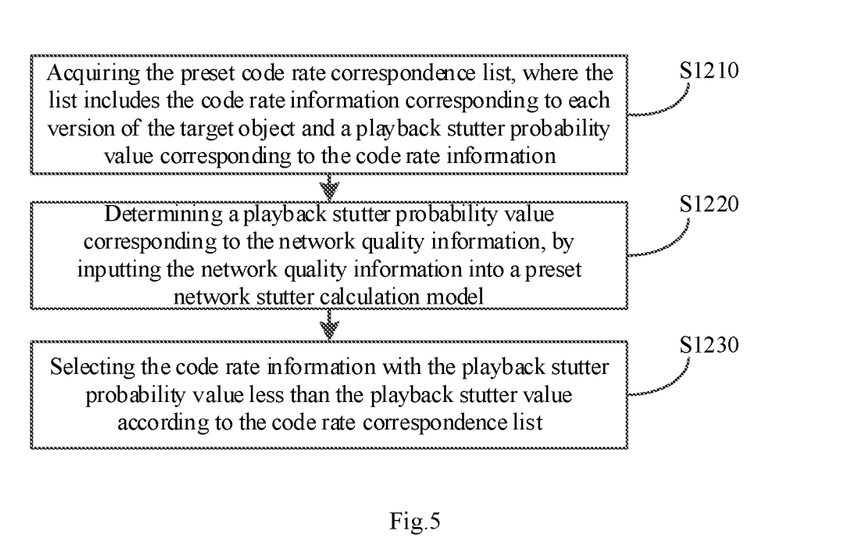
FIG. 5 is a schematic flow chart of acquiring the code rate information according to an embodiment of the present application.

In some embodiments, referring to FIG. 5, FIG. 5 is flow chart of acquiring the code rate information according to an embodiment of the present application.

S1210: acquiring the preset code rate correspondence list, where the list includes the code rate information corresponding to each version of the target object and a playback stutter probability value corresponding to the code rate information.

After a media file is uploaded to the server side, it is transcoded into different code rates and stored in the form of independent files. Different code rate versions of the same media file each has the corresponding code rate information and playback stutter probability value, which are stored in the code rate correspondence list.

S1220: determining a playback stutter value corresponding to the network quality information, by inputting the network quality information into a preset network stutter calculation model.

The network stutter calculation model is used to calculate the playback stutter values of different code rate versions of the target video that are downloaded and played under the network quality based on the input network quality information. In some embodiments, taking the target object including three code rate versions (low code rate version (1000 kbps), medium code rate version (2000 kbps) and high code rate version (3000 kbps) respectively) as an example, under the same network quality, the playback stutter value of the low code rate version is 0.2, the playback stutter value of the medium code rate version is 0.4, and the playback stutter value of the high code rate version is 0.7. Of course, in a specific implementation, the playback stutter value may also be calculated in other ways.

S1230: selecting the code rate information with the playback stutter probability value less than the playback stutter value based on the code rate correspondence list.

In some embodiments, taking the target object including three code rate versions (low code rate version (1000 kbps), medium code rate version (2000 kbps) and high code rate version (3000 kbps) respectively) as an example, the playback stutter probability value of the low code rate version in the code rate correspondence list is 0.1, the playback stutter probability value of the medium code rate version in the code rate correspondence list is 0.3, and the playback stutter probability value of the high code rate version in the code rate correspondence list is 0.9. Under the network quality of the user network, the low code rate version and the medium code rate version meet the selection conditions, and the code rate of the medium code rate version is higher than that of the low code rate version, so the target object with the medium code rate version is selected to download. The code rate of the target object can be maximized under the premise of ensuring no stutter, thus improving the user experience.

In some embodiments, the method for media code rate self-adaptation (SR2A) of the present application may further select the code rate parameter of the target object based on the user's viewing habits combining with the quality of the user network. In some embodiments, firstly the bandwidth is statistically modeled by way of histogram distribution based on the historical bandwidth data of the user network, and then the time gap between different videos watched by the user is statistically modeled based on the user's behavioral habits of watching videos, and finally the video code rate is maximized, under the premise that the stutter probability is less than a preset stutter threshold, based on the code rate information of each code rate version in the media description file. In some embodiments, the principle of the bandwidth histogram statistical model is: for each user terminal, the average bandwidth is counted every $\tau$ seconds as a sampling point and stored in a sliding window of T seconds. The sampling points of each bandwidth are all quantized to a set of discrete points, expressed as (b1, b2, ... bn). For a given bandwidth b, it is quantified as the throughput bi:

max bi $$s.t\ b=<bi \qquad (1)$$

Then, the probability distribution of the throughput bi is represented by a histogram, and the probability of the throughput bi is pi, so $\Sigma pi=1$.

During video watching, the duration of buffering the video is represented by the queue q(t). At the same time, it is assumed that a short video is encoded into L different bit rates V1<V2< ... VL. Compared to the constant code rate encoding (CBR), the video uses the variable code rate encoding (VBR), which can achieve the higher encoding efficiency. Therefore, the actual code rate of the video changes over time. For the $j^{th}$ code rate of the $i^{th}$ short video, the actual code rate at the $t^{th}$ second is expressed as $v_{ij}^t$, where t=1, 2, ... di, and di is the duration of the $i^{th}$ short video. Therefore, the formula of the buffered video duration q(t) becomes:

$$q(t)=\Delta+t-\Sigma v_{ij}^t/b(t) \qquad (2)$$

where b(t) is the statistical bandwidth based on the above histogram, and $\Delta$ is the buffered video duration (typically set to approximately 3-5 frames) before starting to play.

The playback stutter greatly affects the user's experience, and if $\varepsilon$ represents the acceptable maximum stutter probability while watching a short video, the video code rate may be selected based on $P(q(t)<0)<\varepsilon$, where $P(q(t)<0)$ represents the stutter probability at the moment t, and is combined with the formula (2) to obtain:

$$P(\Sigma v_{ij}^t/b(t)-t>\Delta)<\varepsilon,\ \forall 0\leq t\leq di \qquad (3)$$

Finally, the SR2A can be expressed as
arg maxi $$s.t.(3)\ 1\leq i<L \qquad (4)$$

Where s.t. is the abbreviation of subject to, where $v_{ij}^t$ and vi are obtained from the media description file, and L is the total number of available video versions.

The users' viewing behaviors are collected through big data, for example, 10 million viewing behaviors of 100,000 users, including throughput, idle time, interruption events, etc. Based on the data set in which the parameters are set as $\tau=0.5$, T=80 and $\varepsilon=0.05$, each video is transcoded to 3 code rates {1500 kbps, 2000 kbps, 2700 kbps}. It is worth pointing out that the code rate is vbv maxbitrate in the encoding configuration while vbv is used as video code, and the actual code rate depends on the video content and may vary significantly. 3000 short videos are randomly selected to simulate the viewing habits of 100 users (30 videos per user), where the duration is about 100,000 seconds.

The SR2A is compared with the Fixed Rate Approach (FRA, that is a scheme commonly used in short videos) and the Random Rate Selection Approach (RRSA). For all the methods, the average video code rate AVB, the number of interrupted videos (IVC, i.e., the total number of videos that have been interrupted during the entire video viewing process), the interruption duration statistics (ITC, that is the total number of interrupts during the entire video viewing process), and the buffer time (BT, that is the duration consumed by buffering) are compared.

Please referring to table 1 and table 2, table 1 is a performance comparison between SR2A, RRSA and FRA, and table 2 is a detailed performance comparison for a single user.

TABLE 1

| | | AVB (kbps) | IVC | ITC | BT |
|---|---|---|---|---|---|
| FRA | 2700 kbps | 1495.55 | 12.86 | 62.29 | 61.11 |
| | 1500 kbps | 827.61 | 2.96 | 9.2 | 7.88 |
| RRSA | | 1046.06 | 7.65 | 32.73 | 31.26 |
| SR2A | | 1172.45 | 3.54 | 10.27 | 8.72 |

TABLE 2

| | | AVB (kbps) | IVC | ITC | BT |
|---|---|---|---|---|---|
| FRA | 2700 kbps | 1370.56 | 9 | 29 | 25.27 |
| | 1500 kbps | 759.09 | 1 | 1 | 0.88 |
| RRSA | | 1020.25 | 4 | 9 | 7.24 |
| SR2A | | 1192.12 | 1 | 1 | 0.71 |

As shown in table 1, table 1 shows the average performance of 100 users. As can be seen from the comparison, by the FRA, when the selected code rate (vbv_maxbitrate) is set to the maximum available rate, for example 2700 kbps, the maximum average code rate, the highest number of interrupted videos, the number of interrupts and the highest BT are obtained. In this case, the users will experience severe interruptions, to thereby worsen the Quality of Experience (QoE) of the users. On the other hand, when the code rate is set to 1500 kbps (the smallest available code rate), the best performance of the IVC\ITC and BT will be obtained, but the video quality (AVB) is the worst. In this scheme, although the risk of interruption is the lowest, the users cannot get the best viewing quality. The fixed code rate is difficult to adapt to the network conditions that change at any time. The main reason is that there needs to be a fixed balance between video quality and playback interruption. Even the random solution can also achieve the better balance than the FRA. The method and apparatus, the computer device and the storage medium of the present application can achieve the balance between media quality and playback interruption by selecting an appropriate code rate dynamically. The result in table 1 show that the SR2A obtains the larger average video code rate compared with the FRA vbv_maxbitrate=1500 kbps in the case of almost no performance loss in the IVC\ITC and BT; however, on the other hand, compared with the FRA vbv_maxbitrate=2500 kbps, the SR2A obtains the larger average video code rate and the lower IVC\ITC and BT with the acceptable average code rate loss, and the SR2A has the best performance indexes and obtains the higher efficiency compared with the FRA.

As shown in table 2, table 2 shows some detailed performance result of a specific individual user. As can be seen from table 2, the video quality in case of the SR2A is significantly improved, and there is no interruption performance loss, improving the QoE of the users.

In the embodiments of the present application, by acquiring the network quality information of the user network and collecting the users' habits of playing the media files, the maximum available code rate parameters of the target object is selected under the current network conditions to ensure that the stutter probability in the process of playing the media file is lower than the preset stutter threshold, maximizing the code rate of the target object, improving the smoothness in playing the target object, and improving the user experience.

Figure 6:
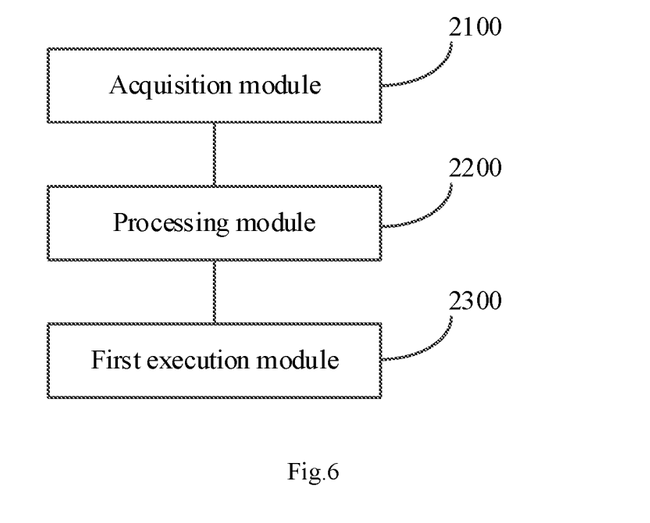
FIG. 6 is a schematic diagram of an apparatus for media code rate self-adaptation according to an embodiment of the present application.

As shown in FIG. 6, an apparatus for media code rate self-adaptation includes: an acquisition module 2100, a processing module 2200 and a first execution module 2300. The acquisition module 2100 is configured to acquire the network quality information of a user network; the processing module is configured to acquire the code rate information corresponding to the network quality information based on a preset code rate correspondence list; and the first execution module is configured to determine the code rate indicated by the code rate information as a code rate parameter of a target object.

By acquiring the network quality information of the user network, then selecting the code rate information based on the network quality information, and determining the code rate indicated by the code rate information as the code rate parameter of the target object, the target object matching with the code rate parameter is thus selected and downloaded. As such, the best code rate of the target object is dynamically determined, avoiding the target object from stuttering or dropping frames during the download process, and improving the user experience.

In some embodiments, the apparatus further includes: a request module and a first receiving module, where the request module is configured to send a data request containing the code rate parameter to a server side; and the first receiving module is configured to receive the target data corresponding to the target object fed back by the server side in response to the data request.

In some embodiments, the apparatus further includes: a sending module, a second receiving module and a second execution module, where the sending module is configured to send a media description request corresponding to the target object to the server side; the second receiving module is configured to acquire a media description file corresponding to the media description request fed back by the server side, where the media description file includes all code rate versions of the target object and the address information corresponding to the code rate versions; and the second execution module is configured to add the address information of the code rate version matching with the code rate parameter to the data request.

In some embodiments, the apparatus further includes: a first acquisition sub-module, a first execution sub-module and a second acquisition sub-module. The first acquisition sub-module is configured to acquire the download duration of a preset download object; the first execution sub-module is configured to input the preset download object and the download duration into a preset network quality calculation model; and the second acquisition sub-module is configured to acquire the network quality information of the user network output by the network quality calculation model.

In some embodiments, the apparatus further includes: a third acquisition sub-module, a third execution sub-module and a first processing sub-module. The third acquisition sub-module is configured to acquire the preset code rate correspondence list including code rate information corresponding to each version of the target object and a playback stutter probability value corresponding to the code rate information; the third execution sub-module is configured to determine a playback stutter value corresponding to the network quality information based on the network quality information and a preset network stutter calculation model; and the first processing sub-module is configured to select the code rate information with a playback stutter probability value less than the playback stutter probability value based on the code rate correspondence list.

In some embodiments, the target object includes at least one of audio and video.

In some embodiments, the network quality information includes: the uplink bandwidth information and downlink bandwidth information of the user network.

In order to solve the above technical problem, an embodiment of the present application further provides a computer device. Please referring to FIG. 7 for details, FIG. 7 is a block diagram of the basic structure of a computer device according to an embodiment of the present application.

Figure 7:
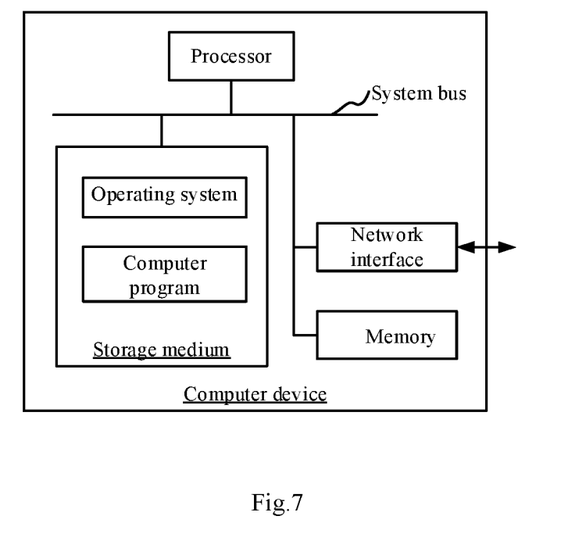
FIG. 7 is a block diagram of a computer device according to an embodiment of the present application.

As shown in FIG. 7, a schematic diagram of the internal structure of the computer device is shown. As shown in FIG. 7, the computer device includes a processor, a non-volatile storage medium, a memory and a network interface connected through a system bus. The non-volatile storage medium stores an operating system, a database and computer readable instructions. The database may store control information sequences, and the computer readable may cause the processor to implement the method for media code rate self-adaptation when being executed by the processor. The processor of the computer device is configured to provide calculation and control capabilities, and supports the operations of the entire computer device. The memory of the computer device may store computer readable instructions that may cause the processor to perform the method media code rate self-adaptation when being executed by the processor. The network interface of the computer device is configured to connect and communicate with a terminal. Those skilled in the art can understand that the structure shown in FIG. 7 is merely a block diagram of a part of the structure related to the solution of the present application, and does not constitute a limitation on the computer device to which the solution of the present application is applied. The specific computer device may include more or fewer components than those illustrated, or combine certain components, or have different component arrangements.

In some embodiments, the processor is configured to execute the specific functions of the acquisition module 2100, the processing module 2200 and the first execution module 2300 in FIG. 6, and the memory stores the program codes and various data required to execute the above modules. The network interface is configured to transmit the data to a user terminal or server. The memory in this embodiment stores the program codes and data required to execute all the sub-modules in the apparatus for media code rate self-adaptation, and the server can invoke the program codes and data of the server to execute the functions of all the sub-modules.

The present application further provides a storage medium storing computer readable instructions, where the computer readable instructions cause one or more processors to perform the steps of the method for media code rate self-adaptation in any one of the above embodiments when being executed by the one or more processors.

It can be understood by those ordinary skilled in the art that the implementation of all or some of the processes in the method of the above embodiments may be completed by using a computer program to indicate the relevant hardware, and the computer program may be stored in a computer readable storage medium and may include the process of each method embodiment described above when the program is executed, wherein the aforementioned storage medium may be a non-volatile storage medium such as a magnetic disk, an optical disc or a Read-Only Memory (ROM), or may be a Random Access Memory (RAM), etc.

It should be understood that various steps in the flowchart of the drawings are shown in sequence as indicated by arrows, but these steps are not necessarily performed in sequence as indicated by arrows. Unless explicitly stated herein, the execution of these steps is not strictly limited in order, and they can be executed in other orders. Moreover, at least a part of the steps in the flowchart of the drawings may include multiple sub-steps or multiple stages. These sub-steps or stages are not necessarily executed at the same time but can be executed at different times, and they are not necessarily executed sequentially either but can be executed alternately or alternatively with other steps or at least a part of sub-steps or stages of other steps.

The above are only a part of the embodiments of the present application. It should be pointed out that those ordinary skilled in the art can make several improvements and modifications without departing from the principle of the present application, and these improvements and modifications should also be considered as the protection scope of the present application.

What is claimed is:

1. A method for media code rate self-adaptation, comprising:
   acquiring network quality information of a user network;
   acquiring a preset code rate correspondence list, wherein the preset code rate correspondence list comprises different code rate information and playback stutter probability values corresponding to the different code rate information, wherein the different code rate information corresponds to different code rate versions of a target object;
   calculating a playback stutter value of downloading and playing a respective one of the different code rate versions of the target object corresponding to the network quality information and based on a preset network stutter calculation model;
   selecting code rate information with playback stutter probability values being less than the playback stutter value from the preset code rate correspondence list;
   determining a code rate parameter of the target object based on the code rate information as a code rate parameter of a target object, wherein the code rate parameter is configured to determine a code rate version of the target object matching with the code rate parameter; and
   sending a data request to a server side, wherein the data request comprises the code rate parameter.

2. The method according to claim 1, further comprising:
   receiving target data corresponding to the target object, wherein the target data is fed back by the server side in response to the data request.

3. The method according to claim 2, further comprising:
   sending a media description request corresponding to the target object to the server side;
   acquiring a media description file corresponding to the media description request fed back by the server side, wherein the media description file comprises all code rate versions of the target object and address information corresponding to the code rate versions;
   adding address information of the code rate version matching with the code rate parameter to the data request.

4. The method according to claim 1, wherein said that acquiring the network quality information of the user network comprises:
   acquiring a download duration of a preset download object;
   inputting the preset download object and the download duration into a preset network quality calculation model;
   acquiring the network quality information of the user network output by the network quality calculation model.

5. The method according to claim 1, wherein the target object comprises at least one of audio and video.

6. The method according to claim 1, wherein the network quality information comprises: uplink bandwidth information and downlink bandwidth information of the user network.

7. A computer device comprising a memory and a processor, wherein the memory stores computer readable instructions that cause the processor to perform:
   acquiring network quality information of a user network;
   acquiring a preset code rate correspondence list, wherein the preset code rate correspondence list comprises different code rate information and playback stutter probability values corresponding to the different code rate information, wherein the different code rate information corresponds to different code rate versions of a target object;
   calculating a playback stutter value of downloading and playing a respective one of the different code rate versions of the target object corresponding to the network quality information and based on a preset network stutter calculation model;
   selecting code rate information with playback stutter probability values being less than the playback stutter value from the preset code rate correspondence list;

determining a code rate parameter of the target object based on the code rate information, wherein the code rate parameter is configured to determine a code rate version of the target object matching with the code rate parameter; and sending a data request to a server side, wherein the data request comprises the code rate parameter.

8. The computer device according to claim 7, wherein the memory stores computer readable instructions that cause the processor to further perform:

receiving target data corresponding to the target object, wherein the target data is fed back by the server side in response to the data request.

9. The computer device according to claim 8, wherein the memory stores computer readable instructions that cause the processor to further perform:

sending a media description request corresponding to the target object to the server side;

acquiring a media description file corresponding to the media description request fed back by the server side, wherein the media description file comprises all code rate versions of the target object and address information corresponding to the code rate versions;

adding address information of the code rate version matching with the code rate parameter to the data request.

10. The computer device according to claim 7, wherein said that acquiring the network quality information of the user network comprises:

acquiring a download duration of a preset download object;

inputting the preset download object and the download duration into a preset network quality calculation model;

acquiring the network quality information of the user network output by the network quality calculation model.

11. The computer device according to claim 7, wherein the target object comprises at least one of audio and video.

12. The computer device according to claim 7, wherein the network quality information comprises: uplink bandwidth information and downlink bandwidth information of the user network.

13. A non-transitory storage medium storing computer readable instructions, wherein the computer readable instructions cause one or more processors to perform:

acquiring network quality information of a user network;

acquiring a preset code rate correspondence list, wherein the preset code rate correspondence list comprises different code rate information and playback stutter probability values corresponding to the different code rate information, wherein the different code rate information corresponds to different code rate versions of a target object;

calculating a playback stutter value of downloading and playing a respective one of the different code rate versions of the target object corresponding to the network quality information and based on a preset network stutter calculation model;

selecting code rate information with playback stutter probability values being less than the playback stutter value from the preset code rate correspondence list;

determining a code rate parameter of the target object based on the code rate information, wherein the code rate parameter is configured to determine a code rate version of the target object matching with the code rate parameter; and sending a data request to a server side, wherein the data request comprises the code rate parameter.

14. The non-transitory storage medium according to claim 13, wherein the computer readable instructions cause one or more processors to further perform:

receiving target data corresponding to the target object, wherein the target data is fed back by the server side in response to the data request.

15. The non-transitory storage medium according to claim 14, wherein the computer readable instructions cause one or more processors to further perform:

sending a media description request corresponding to the target object to the server side;

acquiring a media description file corresponding to the media description request fed back by the server side, wherein the media description file comprises all code rate versions of the target object and address information corresponding to the code rate versions;

adding address information of the code rate version matching with the code rate parameter to the data request.

16. The non-transitory storage medium according to claim 13, wherein said that acquiring the network quality information of the user network comprises:

acquiring a download duration of a preset download object;

inputting the preset download object and the download duration into a preset network quality calculation model;

acquiring the network quality information of the user network output by the network quality calculation model.

17. The non-transitory storage medium according to claim 13, wherein the target object comprises at least one of audio and video.

18. The non-transitory storage medium according to claim 13, wherein the network quality information comprises: uplink bandwidth information and downlink bandwidth information of the user network.

* * * * *